May 26, 1964  J. L. HUITT ETAL  3,134,438
METHOD OF PRODUCING OIL
Filed Dec. 27, 1960
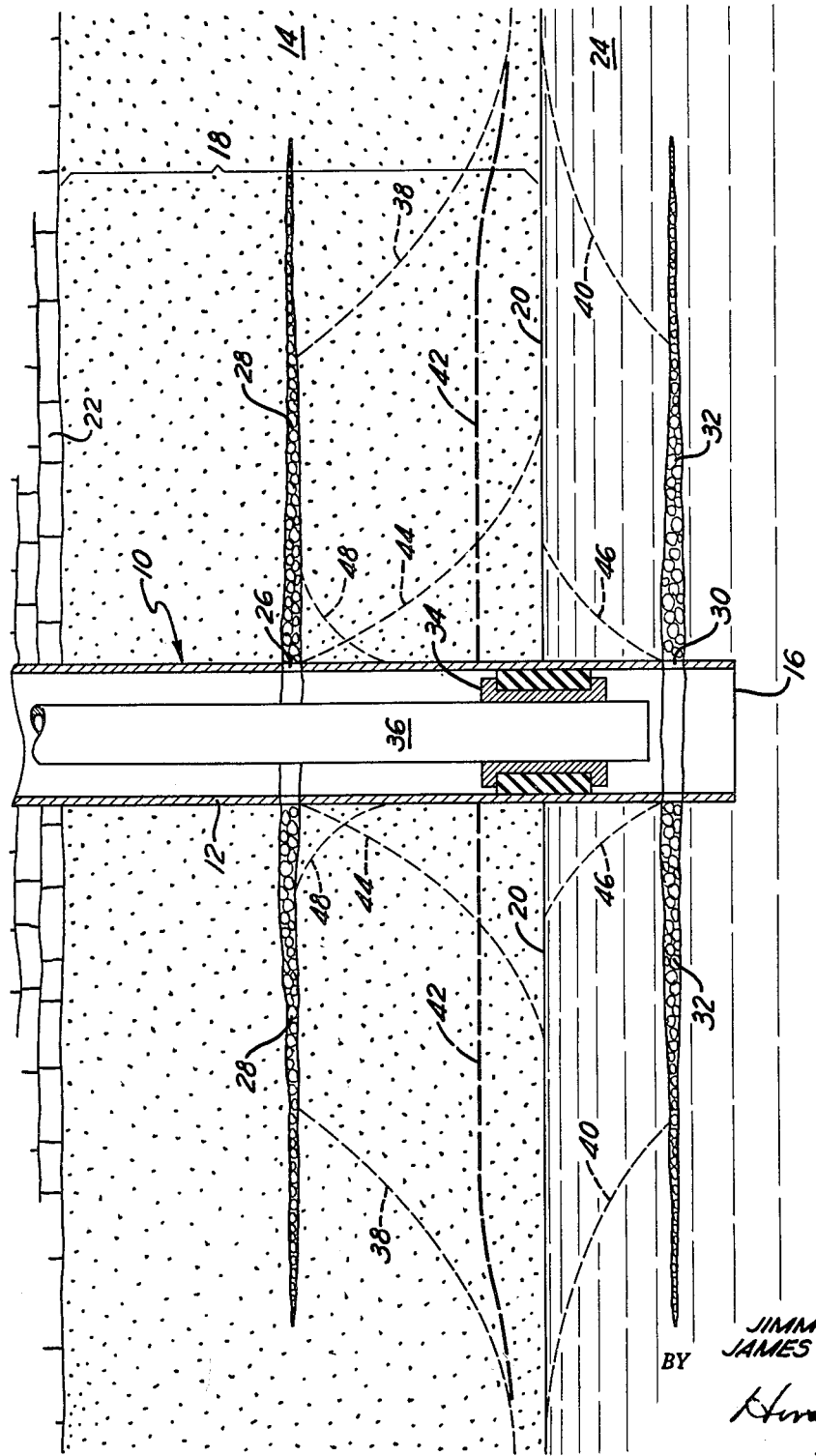
INVENTORS
JIMMIE L. HUITT
JAMES W. JENNINGS
BY
ATTORNEY

United States Patent Office 3,134,438
Patented May 26, 1964

3,134,438
METHOD OF PRODUCING OIL
Jimmie L. Huitt, Glenshaw, Pa., and James W. Jennings, Houston, Tex., assignors to Gulf Research & Development Company, Pittsburgh, Pa., a corporation of Delaware
Filed Dec. 27, 1960, Ser. No. 78,362
3 Claims. (Cl. 166—45)

This invention relates to the production of oil from underground formations and more particularly relates to a method of reducing the amount of fluids other than oil produced with oil through fractures extending from wells into oil-bearing formations.

During the production of oil from oil-bearing formations in which water underlies the oil or gas overlies the oil, fluids in the formation other than the oil cone around the well towards the opening or openings through which the oil flows into the well. The coning is objectionable regardless of whether it is water or gas coning. Gas coning causes excessive gas-oil ratios for the oil produced, which frequently results in a penalty being imposed upon a well by regulatory agencies. The additional water produced with the oil stream because of water coning frequency results in the formation of emulsions which are difficult to break. Water coning also may substantially increase the corrosion of borehole equipment and increase the cost of lifting oil in the well.

The coning of the fluids other than oil into the oil zones of oil wells is caused by the relatively sharp pressure drop in the formation near the well resulting from the radial flow plan of oil into the well. The small difference in density of water and oil, for example, allows water to rise a substantial height above the normal oil-water interface even though the pressure drop from the formation into the borehole of the well, ordinarily referred to as the "drawdown," is not large.

One method that has been used to reduce the amount of water produced with the oil is to drill a well only into the upper part of the formation and thereafter to cause flow of oil into the well only at the top of the formation. It is apparent that such a method is not adaptable for use in thin pay zones. Moreover, as production continues and the oil-water interface rises, the cone of water will reach the openings into the borehole of the well while a substantial amount of oil still remains in the pay zone. In other methods used to reduce coning, barriers designed to block the flow of gas or water into the well are formed in the formation.

It has become increasingly common to fracture formations penetrated by wells to increase the rate at which production of oil can be obtained from the oil-bearing formation to allow a reasonable rate of return on the investment made in the well. Many previously marginal wells are operated profitably because fracturing the oil-bearing formation has increased the rate of production to a level at which continued operation is profitable. The fracture flattens the cone of the fluid other than oil formed during production from the pay zone and has the effect of moving the cone radially outward from the well. Techniques that are frequently used to prevent coning in wells that have not been fractured may not be effective when a horizontal fracture has been made from the borehole of the well. For example, the effect of the fracture in moving the coning radially outward from the well may cause the cone to form beyond a barrier or sealed zone designed to prevent the coning.

This invention resides in a method for preventing the coning of fluids other than oil into the oil stream produced through a fracture extending substantially horizontally from a well into the oil zone of an underground formation. In the process of this invention a substantially horizontal fracture is formed extending from the well into the zone of the formation occupied by the fluid, the coning of which is to be prevented. Sealing means are installed in the well bore to separate the well into one section communicating with the fracture extending into the oil zone and another section communicating with the fracture extending into the zone containing the other fluid. Fluids are then produced simultaneously but separately through the two fractures at a rate controlled to produce a stream of oil substantially free of the other fluid and a stream of the other fluid substantially free of oil.

The single figure of the drawing is a diagrammatic view partially in vertical section illustrating a well having a fracture extending into an oil zone of an underground formation and a lower fracture extending into a water zone underlying the oil zone to prevent coning in accordance with the invention.

Referring to the drawing, a well indicated generally by reference numeral 10 is illustrated having a casing 12 extending through an oil-bearing formation 14 to a total depth 16. The oil-bearing formation 14 is illustrated having an oil zone 18 extending from an oil-water interface 20 upwardly to cap rock 22 overlying the oil-bearing zone 14. The particular formation 14 illustrated in the drawing has a water zone 24 below the oil-water interface which supplies energy for producing oil from the formation.

The casing 12, which usually will be cemented in place in accordance with conventional completion techniques, is cut at 26 above the level of the interface 20 and a substantially horizontal fracture 28 made to extend from the cut 26 into the oil zone by a method of the type described in United States Letters Patent No. 2,699,212 suitably modified for the formation of a horizontal rather than a vertical fracture.

The casing 12 is also cut at 30, below the level of interface 20 and a substantially horizontal fracture 32 is made to extend into the water zone 24 from the cut at 30. Both fractures 32 and 28 are propped open with a suitable propping agent such as sand, nut shells, aluminum spheres, etc., to provide a fracture of high fluid carrying capacity. The radial extent of the fracture 32 is not particularly critical because any ordinary commercial fracturing operation will usually result in a fracture extending well beyond the area of the cone, which is the only essential condition.

Sealing means which can be in the form of a packer 34 are installed within the casing 12 between the cuts 26 and 30. A tubing string 36 is run down the casing and through the sealing means 34. Tubing 36 and sealing means 34 divide the well into an upper annular section communicating with the fracture 28 and a lower section communicating with the fracture 32.

When oil is produced through the fracture 28 with a drawdown sufficient to cause water coning, the resultant water cone is displaced laterally from the well from the position of a cone when production is only through perforations to a position such as is indicated by the curve 38. Because of the ease with which fluids from the formation can enter the fracture 28, the rate of oil production from the well when coning occurs to an extent causing production of water will be substantially higher than the production at which coning to a similar height occurs in the absence of a fracture.

If the only production of the well 10 were through the lower fracture 32, the oil in the oil zone 18 would cone downwardly from the oil-water interface toward fracture 32, as indicated by cone 40. Like the cone indicated by line 38, cone 40 is also displaced radially from the well 10. In this invention fluids are produced through both fractures 28 and 32 and the resultant coning is substantially the average of the cones 38 and 40, which places the oil-water interface along an intermediate line indicated by curve 42.

The position of the resultant oil-water interface 42 can be controlled by control of the relative rates of production through fractures 28 and 32. An increase in the rate of production through fracture 28 relative to the rate through fracture 32 will cause the interface 42 to rise toward the fracture 28. Conversely, an increase in production through the fracture 32 relative to the production through the fracture 28 will cause the interface 42 to move to a lower position. Thus, control of the relative rates of production through the two fractures provides a sensitive means for control of the position of the oil-water interface.

The oil-water interface is not, in fact, a sharp line as indicated in the drawing but is a transition zone, in which there is a mixture akin to an emulsion of oil and water. An increase in the production of water in the oil stream produced through fracture 28 is an indication that the transition zone has risen to the level of that fracture, and can be corrected by an increase in the rate of production through tubing 36. Production of oil through tubing 36 is an indication that the transition zone is too low, and can be corrected by reducing the rate of production through tubing 36. Control also can be obtained by adjustment of the rate of flow through the fracture 28.

It is essential to the process of this invention, and to the production of oil free of water through the fracture 28, that the water be produced through a fracture such as fracture 32 below the oil-water interface rather than through perforations at the level 30 or through a lower zone of reduced permeability. Referring to the drawings, curve 44 indicates the shape of a water cone if production through the upper section of the well should be through perforations through the casing 12 at the level 26. Similarly, curve 46 indicates the shape of the oil cone if production should be only through perforations at the level 30 in the lower section of the well. If production of oil is through a fracture such as 28 and production of water is through perforations or a zone of low permeability below the oil-water interface 20 the net result is the average of the flat radially extended cone 38 and the steep cone 46. The result will be an oil-water interface following cone 38 and curve 48. It will be seen that the water cone rises to a level intersecting the fracture 28 at some distance from the well even though the cone is below the level of fracture 28 immediately adjacent the well. Water entering the outer reaches of the fracture 28 will flow through the fracture 28 and into the upper section of the well above the packer 34.

This invention has been described for the prevention of water coning into the oil production of an oil well but may be equally effective used to prevent coning of gas into the oil production. If the invention is to be used to prevent the coning of gas, the second fracture instead of being lower than the fracture in the oil zone will be located above the normal gas-oil interface. Production of gas through the upper fracture is then controlled in a manner to avoid coning of gas into the fracture in the oil zone in a manner similar to that described for the prevention of water coning.

We claim:
1. A method of producing oil, with reduced production of a fluid other than oil in the produced oil, from a well having a substantially horizontal fracture extending from the well into the oil zone of an oil-bearing formation having a zone of the fluid other than oil adjacent to but vertically displaced from the oil zone, comprising forming a substantially horizontal fracture extending from the well into the zone of the fluid other than oil, setting a packer in the well between the two substantially horizontal fractures to divide the well into an upper zone communicating with the horizontal fracture above the packer and a lower zone communicating with the horizontal fracture below the packer, running tubing down the well and through the packer to communicate with the lower zone, producing oil through the fracture in the oil zone, separately producing the fluid other than oil through the fracture in the zone of fluid other than oil, and controlling the rate of production through one of the fractures to maintain the interface between the oil and the fluid other than oil between the two fractures.

2. A method is set forth in claim 1 in which the fluid other than oil is water and the fracture extending into the water zone is below the fracture extending into the oil zone.

3. A method as set forth in claim 1 in which the fluid other than oil is gas and the fracture extending into the gas zone is above the fracture extending into the oil zone.

References Cited in the file of this patent
UNITED STATES PATENTS

| | | |
|---|---|---|
| 2,596,845 | Clark | May 13, 1952 |
| 2,889,880 | Hughes | June 9, 1959 |